US009654830B2

(12) United States Patent
Austin

(10) Patent No.: US 9,654,830 B2
(45) Date of Patent: May 16, 2017

(54) AUDIOVISUAL CONTENT RECOMMENDATION METHOD AND DEVICE

(75) Inventor: Kenneth Austin, Mold (GB)

(73) Assignee: Inview Technology Limited, Cheshire (GB)

( * ) Notice: Subject to any disclaimer, the term of this patent is extended or adjusted under 35 U.S.C. 154(b) by 0 days.

(21) Appl. No.: 14/240,401

(22) PCT Filed: Jun. 22, 2012

(86) PCT No.: PCT/GB2012/005149
§ 371 (c)(1),
(2), (4) Date: Feb. 23, 2014

(87) PCT Pub. No.: WO2013/027009
PCT Pub. Date: Feb. 28, 2013

(65) Prior Publication Data
US 2015/0052561 A1    Feb. 19, 2015

(30) Foreign Application Priority Data
Aug. 24, 2011    (GB) .................................. 1114698.2

(51) Int. Cl.
*H04N 21/466* (2011.01)
*H04N 21/442* (2011.01)

(52) U.S. Cl.
CPC ... *H04N 21/4666* (2013.01); *H04N 21/44222* (2013.01); *H04N 21/4661* (2013.01)

(58) Field of Classification Search
None
See application file for complete search history.

(56) References Cited

U.S. PATENT DOCUMENTS 6,438,579 B1    8/2002 Hosken
2003/0014759 A1*  1/2003 Van Stam .......... G06F 17/30029
                                                              725/97
(Continued)

FOREIGN PATENT DOCUMENTS

EP    1 135 929    9/2001
EP    1 667 444    6/2006
(Continued)

OTHER PUBLICATIONS

International Search Report & Written Opinion on PCT/GB2012/051459 dated Oct. 30, 2012.
(Continued)

*Primary Examiner* — Nicholas Corbo
(74) *Attorney, Agent, or Firm* — Foley & Lardner LLP; John D. Lanza

(57) ABSTRACT

A method for facilitating the generation of recommendations of audiovisual content for a first user. The method comprises receiving data from a plurality of second users, the received data indicating audiovisual content of interest to the second users. The method further comprises processing the received data to automatically identify a plurality of relationships between interests of one or more of the second users in respective items of audiovisual content in the audiovisual content represented by the received data and generate a recommendation engine. The recommendation engine is adapted to take as input indications of audiovisual content of interest to the first user and to generate recommendations of further audiovisual content of interest to the first user based upon a subset of the plurality of relationships.

15 Claims, 8 Drawing Sheets

(56) References Cited

U.S. PATENT DOCUMENTS

| | | |
|---|---|---|
| 2003/0066068 A1 | 4/2003 | Gutta et al. |
| 2003/0066077 A1* | 4/2003 | Gutta et al. ............... 725/34 |
| 2003/0182249 A1* | 9/2003 | Buczak ..................... 706/15 |
| 2004/0003392 A1* | 1/2004 | Trajkovic ............ H04N 7/163 725/10 |
| 2009/0055385 A1 | 2/2009 | Jeon et al. |
| 2009/0150340 A1 | 6/2009 | Lhuillier et al. |
| 2012/0151527 A1* | 6/2012 | Kumar ................ G06N 5/047 725/40 |

FOREIGN PATENT DOCUMENTS

| | | |
|---|---|---|
| GB | 2 438 646 | 12/2007 |
| WO | WO-03/030528 | 4/2003 |
| WO | WO-03/036970 | 5/2003 |
| WO | WO 03/079688 | 9/2003 |
| WO | WO-2004/052010 | 6/2004 |
| WO | WO-2009/029488 | 3/2009 |

OTHER PUBLICATIONS

United Kingdom Search Report on 1114698.2 dated Dec. 16, 2011.
International Search Report on PCT/GB2012/051459 dated Oct. 30, 2012.
European Examination Report on 12741049.6 mailed on Dec. 6, 2016.

* cited by examiner

AUDIOVISUAL CONTENT RECOMMENDATION METHOD AND DEVICE

The present invention relates to a method for facilitating the generation of at least one recommendation for audiovisual content of interest to a user, and has particular, but not exclusive application for use in conjunction with electronic programme guides (EPGs). Audiovisual content may include video content, audio content or both. The terms programme is generally used herein to refer to an item of audiovisual content.

The number of viewing device channels (Including radio stations, some of which provide only audio, not video, content) now available to users means that the choice of available programmes is vast. Further, viewing devices (including computers adapted to receive viewing device signals) and set-top boxes increasingly provide means to connect to external networks, and in particular the Internet. Such Internet connections allow the delivery of yet more programmes to a viewing device or set-top box.

The proliferation of programming options places a large burden on the user when deciding which programmes to consume (i.e. watch, listen, record, etc). Programme guides (for example EPGs) provide users with a list of available programmes and the times at which they can be consumed. Such programme guides may also provide a description, and a genre, for each programme so that a user can determine whether that programme broadly matches the Users interests. It will be appreciated that the number of programmes is such that it is unfeasible for most users to make selections from all available programme choices using a standard programme guide. Further, given the complexity of users' interests, the length of descriptions that are provided in such programme guides are often insufficient for a user to determine whether a programme will match their interests.

in order to alleviate the burden on users, some EPGs provide automated recommendations for programmes which a user may wish to consume. For example, it is known for a user to input into an EPG one or more broad genres of interest. Where an available programme has been pre-classified as belonging to an indicated genre, the EPG can generate a recommendation for that programme. FIG. 1 illustrates an example where a number of viewing device programmes have been pre-classified as belonging to a "sci-fi", "comedy", "quiz", "motoring" or "science" genre. While such a system potentially alleviates the need for a user to manually search a programme guide for programmes which belong to genres of interest, the categorization provided is crude and does not capture or utilize the complexity of users' interests.

Given the number of users and the variance in preferences between users, it will be appreciated that this complexity is beyond that which can be represented by simple genre categorisation, or short descriptions. Indeed, it is unfeasible to predefine the programming characteristics on which a user bases a decision to watch any particular programming. This complexity can be usefully illustrated by considering a multi-dimensional characteristic space, where each dimension in the characteristic space represents a characteristic type that can be used to describe a particular interest of one or more users. For example, a particular dimension in the characteristic space may indicate when a plot occurs and have points within that dimension for the past, present or future, for example. A user can be represented as a surface in the characteristic space which intersects those points that represent the user's particular interests. A programme can similarly be represented by a surface which intersects points in the characteristic space corresponding to characteristics of the programme. It will be appreciated that such a characteristic space, encompassing many users will be large and complex.

An alternative method of recommendation generation utilises a user's viewing history. For example, it is known to provide a system for generating a list of programmes available for viewing based on those programmes that a user has previously watched. For example, where a user watches a first programme in a series of programmes, a recommendation may be made for the second programme in that series. This is useful in that it prevents a user from missing programmes in which they may be interested. While this system may provide reasonable recommendations for programmes that a user has previously watched (for example programmes in a series), the system cannot make recommendations for programmes that a user has not already watched.

An approach based upon user's viewing history can be combined with the genre-based approach described above, to help users find programmes for viewing which loosely match their previous viewing history. For example, if an EPG determines that a user watches a large number of programmes that have been pre-characterized as belonging to a "sci-fi" genre, the system may recommend other programmes belonging to the "sci-fi" genre. Again, however, recommendations based upon coarse genre classifications cannot generate recommendations which match the complex and eclectic tastes of many users.

Other prior art systems utilise direct programme associations. An example of programme associations is shown in FIG. 2. In FIG. 2, programmes are represented by nodes in a graph. Connections between respective nodes represent an assigned measure of relatedness between the programmes represented by those respective nodes given as a percentage. The relatedness may be based upon a number of factors, may not be based upon the same factors. For example, it can be seen that a programme "Dr Who" is connected to a programme "Star trek" with a relatedness of 25%. In this way, a user who has viewed "Dr Who" may be provided with a recommendation for "Star trek". Such direct programme associations require pre-characterisation of each programme in order to make recommendations. Such pre-characterisation is generally based upon coarse measures, and does account for the subtleties of user's interests in the real world, resulting in sub-optimal programme recommendations.

It is an object of the present invention to obviate or mitigate one or more of the problems outlined above.

According to a first aspect of the present invention, there is provided a method for facilitating the generation of recommendations of audiovisual content for a first user, the method comprising receiving data from one or more second users, the received data indicating audiovisual content of interest to the one or more second users; processing the received data to automatically identify relationships between interests of one or more of the second users in respective items of audiovisual content in said audiovisual content represented by said received data and generate a recommendation engine, the recommendation engine being adapted to take as input indications of audiovisual content of interest to the first user and to generate recommendations of further audiovisual content of interest to the first user based upon a subset of said relationships.

In this way, a recommendation engine is generated which can facilitate the generation of recommendations for a first user based upon the interests of one or more second users.

By processing the received data to automatically identify relationships between the second users and audiovisual content and generating recommendations based upon those relationships, the recommendations generated by the recommendation engine for the first user are tailored to the first user based upon audiovisual content of interest to second users who have similar interests to the first user. Further, by basing the recommendations on audiovisual content of interest to the second users, this allows the recommendation engine to generate recommendations for audiovisual content which has not been viewed or listened to by the first user.

The received data may comprise data indicating audiovisual content viewed or listened to by at least one of the second users, and/or the received data may comprise data indicating second audiovisual content which has not been viewed or listened to by at least one of the second users. For example, the data indicating second audiovisual content may indicate audiovisual content which has not been viewed or listened to by any of the second users.

The recommendation engine may be adapted to generate recommendations for the audiovisual content indicated in the received data, including recommendations for audiovisual content which has been viewed or listened to by at least one of the second users, and/or recommendations for the second audiovisual content which has not been viewed or listened to by at least one of the second users, and/or audiovisual content which has not been viewed or listened to by any of the second users.

The data indicating second audiovisual content may indicate that the at least one second user has indicated an interest in the second audiovisual content. For example, the data indicating second audiovisual content may indicate that a representation of the second audiovisual content has been selected by at least one of said second users, for example using an electronic programme guide. For example, the second user may have interacted with an advert for the second audiovisual content, or instructed an EPG to record the second audiovisual content.

In this way, the recommendation engine can take into account audiovisual content not viewed or listened to by any of the users (first or second), but for which an interest has been indicated. For example, where one or more second users believe that they will enjoy particular audiovisual content, this information can be utilized to make recommendations for the first user.

Similarly, the indications of audiovisual content of interest to the first user may comprise indications of audiovisual content which has not been viewed or listened to by the first user. In this way, recommendations for the first user can take into account audiovisual content which the first user believes would be of interest.

The method may further comprise transmitting at least part of the recommendation engine to the first user. For example, transmitting at least part of the recommendation engine may comprise transmitting only part of the recommendation engine. The part of may be based upon audiovisual content of interest to the first user. In this way, the size of the recommendation engine that is transmitted can be reduced. Further, the transmitted part of the recommendation engine may be utilized more efficiently as it may require less processing to generate recommendations.

The decision engine may be a neural network. The neural network may comprise a plurality of input nodes each input node representing respective a respective audiovisual content item, at least one hidden layer node and a plurality of output nodes each output node representing a respective audiovisual content item. Each input node may be connected to each hidden layer node by a connection having a respective weight. Each hidden layer node may be connected to each output node by a connection having a respective weight. For example, the neural network may be a multi-layer perceptron, but may be any other type of neural network. It will be appreciated that while neural networks are useful, other types of data processing methods may be used (for example, "boosting" algorithms), and as such, the present invention is not limited to implementations using neural networks.

Where the recommendation engine is a neural network, the part of the recommendation engine transmitted to the first user may comprise only those input nodes corresponding to audiovisual content items of interest to the first user, only those hidden layer nodes which can be activated by the input nodes of the part and only those output nodes which can be activated by the hidden layer nodes of the part. Only some of the connections between the Input nodes and the hidden layer nodes, or between the hidden layer nodes and the output nodes may be transmitted in the part. For example, the part may include only those connections having weights which are deemed to meet a predetermined criterion (such as only those weights belonging to input connections to a node that can collectively cause the node to respond).

The data received from one or more second users may comprise data indicating audiovisual content of interest to at least one of the second users during a preceding predetermined period. For example, the preceding time period may be a single day, but may be any other time period.

Receiving data from one or more second users may comprise receiving data from a plurality of respective second users. In this way, recommendations can be generated based upon the interests of a plurality of second users, thereby increasing the accuracy of the recommendations.

The method may further comprise, for each respective second user: determining if the audiovisual content of interest to the second user meets at least one predetermined criterion; if the audiovisual content does not meet the at least one predetermined criterion, receiving further data from an additional second user the further data indicating audiovisual content of interest to the additional second user and processing the further data to generate the recommendation engine. For example, the at least one predetermined criterion may comprise a minimum number of respective audiovisual content items indicated as being of interest to the respective second user. Alternatively, or additionally, the at least one predetermined criterion may comprise a minimum number of audiovisual content items not viewed or listened to by a predetermined number of others of the second users.

In this way, it can be assured that the data indicating audiovisual content of interest to the plurality of second users includes indications of sufficient, and sufficient quality, audiovisual content to generate useful recommendations. Preferably a suitably large number of second users (for example one thousand) is utilised to capture the diverse range of potential viewing interests. Capturing the viewing interests of a suitably large number of second users allows the recommendation engine to make recommendations to a first user based on the viewing interests of Those second users whose viewing interests are most similar to the viewing interests of the first user.

Processing the received data to generate the recommendation engine may comprise training a neural network to identify relationships between audiovisual content items indicated in the data received from at least one second user. The recommendation engine may be the trained neural network.

The recommendation engine may be adapted to assign a respective priority to each generated recommendation. For example, the data received from one or more second users may comprise data indicating timeslots associated with respective audiovisual content items in the audiovisual content of interest to the second users. Priority may then be assigned to recommendations based upon those timeslots. For example, the data from the second users may indicate when particular audiovisual content items are viewed by a particular second user. Priority can then be assigned to recommendations based upon timeslots in dependence upon when particular audiovisual content items are most often viewed by the second users.

The recommendation engine may be adapted to generate at least one first recommendation having a first priority using a first subset the relationships and to generate at least one second recommendation having a second priority using a second subset of the relationships. For example, where the recommendation engine is a neural network, the recommendation engine can be run a plurality of times using different activation functions, and different priorities can be assigned to a particular recommendation based upon the activation function that was used in the generation of that recommendation.

The recommendation engine may be adapted to display the first at least one recommendation on a display as a primary recommendation and to display the second at least one recommendation on the display as a secondary recommendation.

According to a second aspect of the present invention, there is provided a method for generating at least one recommendation for audiovisual content for a first user, comprising: receiving first data indicating audiovisual content of interest to the first user; providing the first data as input to at least part of a recommendation engine, the recommendation engine having been generated based upon second data indicating audiovisual content of interest to one or more second users processed to automatically identify relationships between interests of the second users in respective audiovisual content items in said audiovisual content represented by said second data, the recommendation engine being adapted to take the input of audiovisual content of interest to the first user and to generate recommendations of further audiovisual content of interest to the first user based upon a subset of the relationships.

The second data may comprise data indicating audiovisual content viewed or listened to by at least one of the second users.

The recommendation engine may be adapted to generate recommendations for the audiovisual content indicated in the received data.

The second data may comprise data indicating second audiovisual content which has not been viewed or listened to by at least one of the second users and the recommendation engine may be adapted to generate recommendations for the second audiovisual content.

The data indicating second audiovisual content may indicate that the at least one second user has indicated an interest in second audiovisual content. The interest may be indicated by selection of a representation of the second audiovisual content using an electronic programme guide. For example, the representation may be displayed as part of an EPG, or as an advert such as a banner displayed on a screen, or may comprise a trailer for the audiovisual content.

The method may further comprise receiving the at least part of the recommendation engine. For example, the method may comprise receiving the at least part of the recommendation engine from a further device, such as a server, or a device belonging to a further user (for example, one of the second users, or a user who is not the first user or one of the second users).

Receiving at least part of the recommendation engine may comprise receiving only part of the recommendation engine. The part may be based upon audiovisual content of interest to the first user.

The recommendation engine may be a neural network.

Recommendations may be generated which have differing priorities. For example, recommendations may be generated which have different priorities based upon different subsets of the identified relationships between the second users and respective audiovisual content items in said audiovisual content represented by said second data. The recommendation engine may be run a plurality of times with the same input, but with differing thresholds. In this way, a plurality of recommendations can be presented to a user. For example, where the recommendation engine is a neural network, generating the at least one first recommendation may comprise supplying the neural network with a first activation function to generate first recommendations having a first priority, and the method may further comprise supplying the neural network with a second activation function to generate at least one second recommendation, the at least one second recommendation having a second priority.

The method may further comprise displaying the first at least one recommendation on a display as a primary recommendation and displaying the second at least one recommendation on said display as a secondary recommendation.

The neural network may comprise a plurality of input nodes each input node representing a respective audiovisual content item, at least one hidden layer node and a plurality of output nodes each output node representing a respective audiovisual content item.

The received part of the recommendation engine may comprise only those input nodes corresponding to audiovisual content items of interest to the first user, only those hidden layer nodes which can be activated by the input nodes of the part and only those output nodes which can be activated by the hidden layer nodes of the part.

The second data may comprise data indicating audiovisual content of interest to at least one of the second users during a preceding predetermined period.

The second data may comprise data from a plurality of respective second users.

The method may further comprise comparing the generated recommendations with audiovisual content available to the first user; and displaying only those recommendations for audiovisual content available to the first user. In this way, the user is not presented with recommendations for audiovisual content which he cannot access. Alternatively, the user may be presented with recommendations for audiovisual content that is not available to the first user. In this way, the first user's attention can be drawn to audiovisual content which he cannot access, but which he may wish to access. Means may be provided with the displayed recommendation to allow the user to access the audiovisual content. For example, an option to purchase any recommended audiovisual content may be provided.

The method may further comprise receiving third data representing audiovisual content available to the first user, at least part of said audiovisual content having not been viewed or listened to by the first user, displaying representations of the audiovisual content represented by the third data on a display, receiving data indicating selected audiovisual content from the audiovisual content available to view by the first user and transmitting data indicating the selected audiovisual content to a server for generation of a recommendation engine.

The method may comprise receiving EPG data. Alternatively, or additionally, the method may comprise receiving data other than EPG data indicating audiovisual content which has not been viewed or listened to by the first user. For example, data may be received in the form of programme promotions (for example, through short clips of the audiovisual content (i.e. trailers) or advertising banners), and similarly, the method may also comprise displaying such data on a screen and receiving data indicating a selection of audiovisual content and transmitting data indicating the selected audiovisual content to a server for generation of a recommendation engine.

Generating the at least one first recommendation may comprise generating first recommendations having a first priority using a first subset of the relationships between the second users and respective audiovisual content items in said audiovisual content represented by said second data, and the method may further comprise generating at least one second recommendation having a second priority using a second subset of the relationships between the second users and respective audiovisual content items in said audiovisual content represented by said second data.

The method may further comprise displaying the first at least one recommendation on a display as a primary recommendation, and displaying the second at least one recommendation on said display as a secondary recommendation.

According to a third aspect of the present invention, there is provided a method for generating at least one programme recommendation for a first user, comprising: at a first computer: receiving first data indicating audiovisual content of interest to one or more second users; processing the first data to automatically identify relationships between interests of the second users in audiovisual content items in said audiovisual content and generate a recommendation engine, the recommendation engine being adapted to take as input indications of audiovisual content of interest to the first user and being adapted to generate recommendations of further audiovisual content of interest to the first user based on a subset of the relationships; transmitting at least part of the recommendation engine to a second computer; and at the second computer: receiving the at least part of the recommendation engine and generating at least one recommendation by providing data indicating audiovisual content of interest to the first user as input to at least part of a recommendation engine.

According to a fourth aspect of the present invention, there is provided a method of generating a recommendation engine, comprising: at a user device: receiving data indicating audiovisual content that has not been viewed or listened to by said first user; displaying representations of the audiovisual content on a display; receiving data indicating a selection by said first user of the audiovisual content transmitting data indicating the selection to a further device; and at the further device: processing the data indicating said selection to generate a recommendation engine, the recommendation engine being adapted to take as input indications of audiovisual content of interest to a second user and being adapted to generate recommendations of further audiovisual content of interest to the second user based at least in part on the said selection by said first user.

For example, the indications may be displayed as part of an EPG and the selection may be, for example, a command to set a reminder for the audiovisual content, or a command to record/download the audiovisual content. Alternatively, or additionally, the indications may be displayed in the form of programme promotions (for example, through short clips of the audiovisual content (i.e. trailers) or advertising banners).

The recommendation engine may be operated to provide recommendations to a plurality of first users who have dissimilar viewing interests, and such operation need only involve the input to the recommendation engine of the viewing interests of the first user using the recommendation engine.

It will be appreciated that aspects of the present invention can be implemented in any convenient way including by way of suitable hardware and/or software. Alternatively, a programmable device may be programmed to implement embodiments of the invention. The invention therefore also provides suitable computer programs for implementing aspects of the invention. Such computer programs can be carried on suitable carrier media including tangible carrier media (e.g. hard disks, CD ROMs and so on) and intangible carrier media such as communications signals.

It will be appreciated that features presented in the context of one aspect of the invention in the preceding description can equally be applied to other aspects of the invention.

Embodiments of the present invention are now described, by way of example, with reference to the accompanying drawings, in which.

Generally, the system of the present invention generates recommendations for programming viewable by a user of the system based upon the viewing preferences of a plurality of others users in the system. In particular, the present invention provides methods for generating a neural network to determine relationships between similar and dissimilar programmes white at the same time classifying users of the system into groups. These groups are automatically created by appropriate training of the neural network as is described in more detail below.

Figure 1:
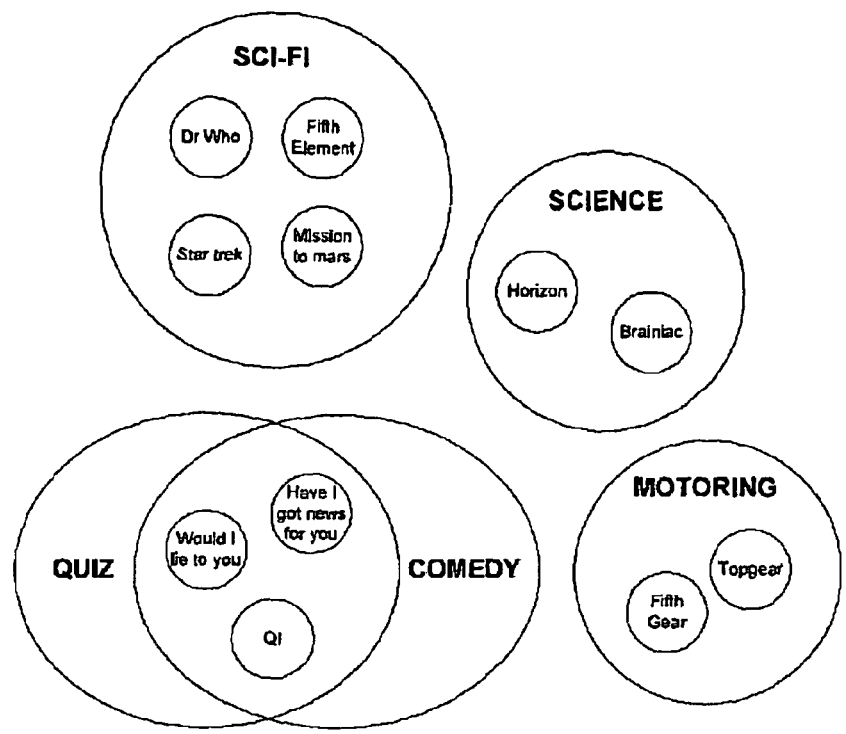
FIG. 1 is an example of a prior art classification system for audiovisual content items based upon genre.
Figure 2:
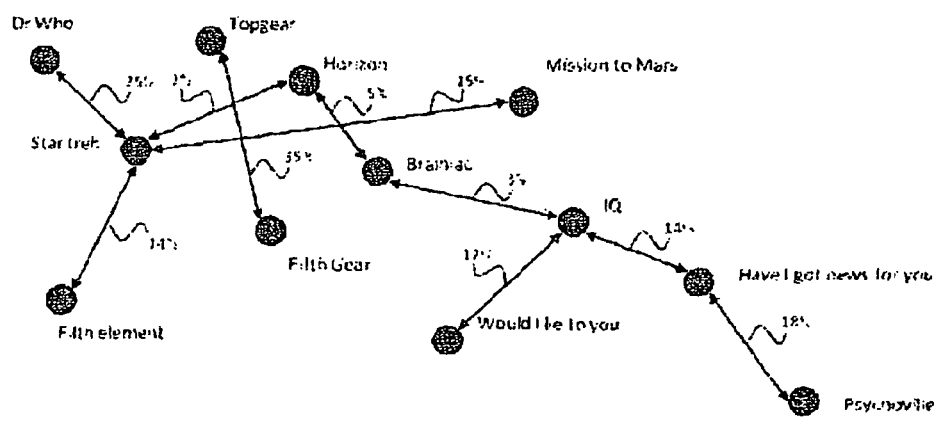
FIG. 2 is an example of a prior art system of direct audiovisual content item associations.
Figure 3:
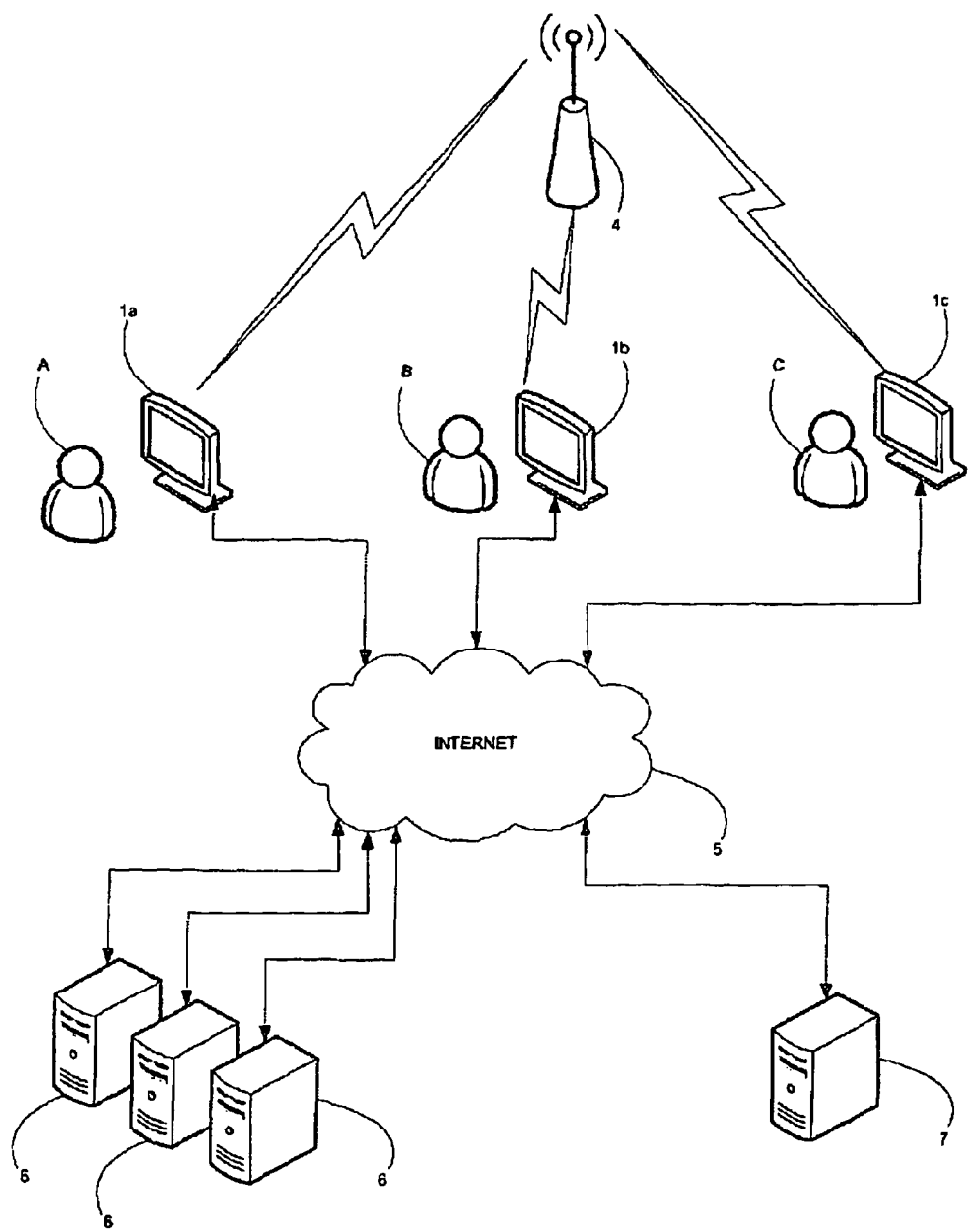
FIG. 3 is a schematic illustration of a system suitable for implementing an embodiment of the present invention.

FIG. 3 shows three users A, B, C each having a corresponding viewing device 1a, 1b, 1c. It will be appreciated that, while three users are shown in FIG. 3 for clarity, the present invention is applicable to any number of users and would generally include a far larger number of users than is shown in FIG. 3. Each of the viewing devices 1a, 1b, 1c is adapted to receive programmes (including radio programmes) broadcast from a transmitter 4. Each of the viewing devices is further adapted to connect to the Internet 5 and to receive media content from servers 6. That is, users A, B, C can access both broadcast content from the transmitter 4 and content delivered to the viewing devices 1a, 1b, 1c via the Internet 5.

Each of the viewing devices 1a, 1b, 1c connects to a further server 7. The server 7 is configured to receive viewing histories of the users A, B, C, and to processes those viewing histories to generate a neural network, and to transmit that neural network to each of the viewing devices 1a, 1b, 1c.

Each of the viewing devices 1a, 1b, 1c is configured run software which provides a respective electronic programme guide (EPG). The EPG can be activated by a user A, B, C to display lists of available programmes from both the transmitter 4 and the servers 6. As is described in more detail below, each EPG is further adapted to utilize neural networks received from the server 7 to generate and display recommendations to a user regarding available programming which matches the interests of the user.

Figure 4:
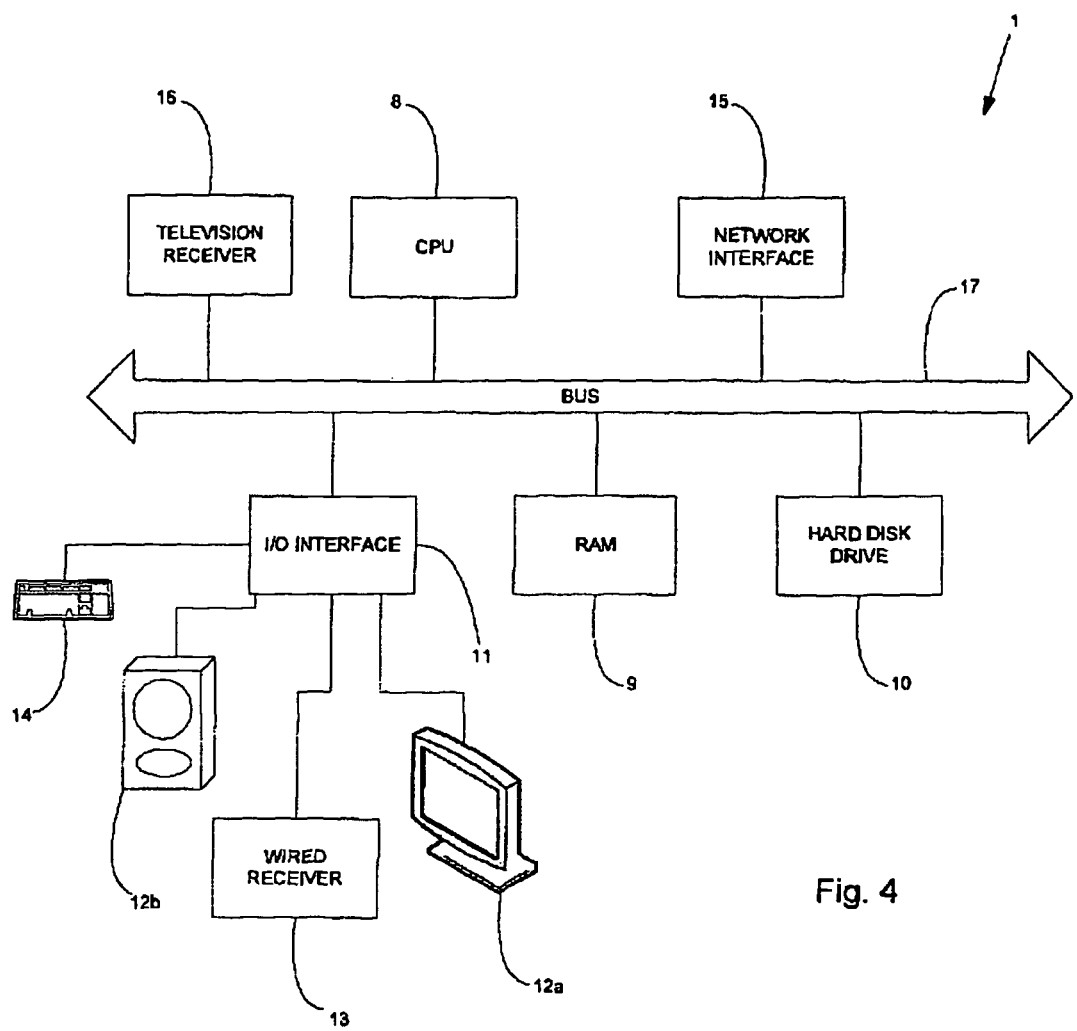
FIG. 4 is a schematic illustration of components of a viewing device of FIG. 3.

Referring to FIG. 4, there is shown a schematic illustration of components which can be used to implement the viewing devices 1a, 1b, 1c. It will be appreciated that the components of the viewing device 1 illustrated in FIG. 4 and described below are merely exemplary, and that any suitable components may be used to implement embodiments of the present invention.

The viewing device 1 comprises a CPU 8 which is configured to read and execute instructions stored in a volatile memory 9 which takes the form of a random access memory. The volatile memory 9 stores instructions for execution by the CPU 8 and data used by those instructions. In the present embodiment, the instructions stored in the volatile memory 9 are instructions to cause the CPU 8 to generate and display an EPG, and to process neural networks received from the server 7, together with a user's viewing history to generate programme recommendations.

The viewing device 1 further comprises non-volatile storage in the form of a hard disk drive 10. The hard disk drive 10 is used to store users' viewing histories and neural networks received from the server 7. It will be appreciated that non-volatile storage can be provided by other means, such as a solid state memory. The viewing device 1 further comprises an I/O interface 11 to which are connected peripheral devices used in connection with the viewing device 1. More particularly, a display 12a is configured so as to display output from the viewing device 1. In particular, the display 12 displays visual content of programming received from the transmitter 4 or from the servers 6. Additionally, the display 12a displays an EPG generated by the CPU 8. A speaker 12b is configured so as to provide audio output from the viewing device 1. In particular, the speaker 12b outputs audio content of programming received from the transmitter 4 or from the servers 6. Input devices are also connected to the I/O interface 11. Such input devices may include an wireless receiver 13 for receiving commands from a remote control device (not shown) or a wireless keyboard (not shown). Additionally, a wired keyboard 14 may be connected to the I/O interface 11. The display 12a may a touch-screen display allowing interaction with the viewing device 1.

A network interface 15 allows the viewing device 1 to be connected to the Internet (or any other appropriate network) so as to receive and transmit data from and to other computing devices, such as the servers 6, 7. A television signal receiver 16 receives television signals broadcast from the transmitter 4. The CPU 8, volatile memory 9, hard disc drive 10, I/O interface 11, network interface 15 and television receiver 16, are connected together by a bus 17.

It will be appreciated that the servers 6, 7 may be implemented using similar components to those of the viewing device 1, but may not include a television signal receiver 16.

Each of the viewing devices 1a, 1b, 1c is adapted to record data indicating programmes that are viewed or listened to by respective users A, B, C on the respective viewing devices 1a, 1b, 1c. Periodically (for example, daily) the viewing devices 1a, 1b, 1c transmit their respective collected viewing history data (including programmes with only audio content) via the Internet 5 to the server 7 for processing. As is now described in more detail with reference to FIG. 5, the server 7 processes the received viewing history data to train a multilayer neural network to recognise relationships between the viewing histories of a plurality of users.

Figure 5:
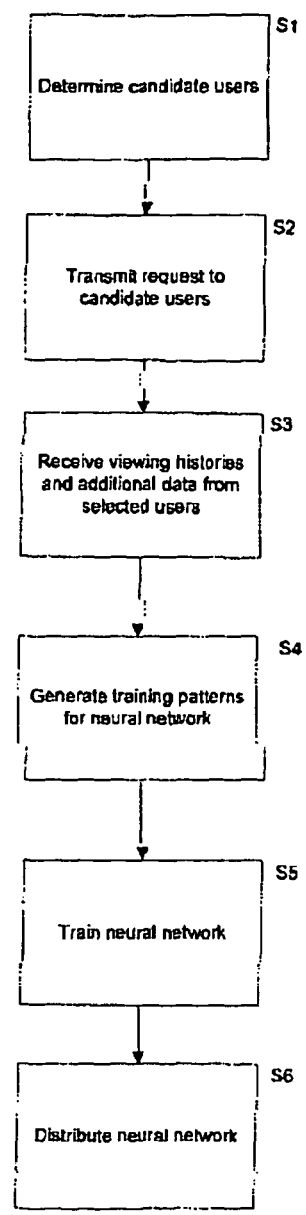
FIG. 5 is a flow chart illustrating processing carried out by a server of FIG. 3.

FIG. 5 is a flowchart illustrating processing carried out by the server 7 to generate a neural network. The processing of FIG. 5 is performed periodically, for example daily. At step S1 the server 7 determines a candidate set of users from the users A, B, C, whose viewing histories will form a training set of data to train the neural network. It may, for example, be desirable to select the candidate set of users so as to include those users who view a large number of programmes, and to include a spread of users with different tastes and interests. For example, a set of one-thousand users may be sufficient to represent a sufficient number of viewing characteristics to make a neural network generally applicable. It should be noted, however, that any suitable number of candidate users may be utilized. The viewing histories of users may be continuously monitored in order to select the candidate set of users. The particular users making up the candidate set may be modified as the viewing patterns of particular users change over time.

In addition to the viewing histories of the candidate set of users A, B, C, additional information about the interests of each user A, B, C in the candidate set may be recorded by each users respective viewing device 1a, 1b, 1c. The additional data may comprise the responses of users to promotions for future programming. For example, the software operating to provide an EPG on the viewing device of a user in the candidate set may be configured to monitor that user's interactions with promotional material for future, un-viewed or unaired programming (for example advertising banners, trailers, etc) displayed by the software, or to record when that user interacts with their EPG to set a programme reminder for, or to record, a future programme. Other examples of additional data relating to future programming will be readily appreciated by those skilled in the art in light of the above.

Processing then passes to step S2 at which a request for the respectively recorded viewing histories and additional data is transmitted from the server 7 to each of the selected candidate users. The viewing histories and additional data are received at the server at step S3. It will be appreciated that the processing of steps S1 to S3 need not be performed in the order illustrated in FIG. 5. For example, the viewing histories of all users A, B, C in a system (i.e. not only those of a chosen candidate set of users) may be acquired, and a decision as to which of those users' viewing histories will form the training set made subsequently. This may, for example, be particularly beneficial in a first iteration of the processing of FIG. 5 in order to determine those users having the most appropriate viewing habits for inclusion within the candidate set.

Processing then passes to step S4, at which the received viewing histories are used to generate a plurality of training patterns, each training pattern having an input (one or more programmes viewed by a user) and corresponding "target" outputs (programmes viewed by the user). For each training set, every programme in the input is also in the target outputs. While the server 7 may receive viewing histories for the candidate users daily, the training patterns may comprise viewing histories spanning a longer period of time, for example seven days. That is, data received during previous daily iterations of the processing of FIG. 5 may be combined with the viewing history data received during a current iteration. Viewing history data may be integrated over a longer period of time.

Processing then passes to step S5, at which the training patterns generated at step S4 are used to train a neural network, and at step S6 the network is distributed to the viewing devices 1a, 1b, 1c of the users A, B, C over the Internet 5.

The neural network of the presently described embodiment is a type of neural network known as a multilayer perceptron, although it will be appreciated that other types of neural network could be used. Multilayer perceptrons will be well known to those skilled in the art, and as such are not discussed in detail herein. In general terms, however, the neural network comprises an input layer having a plurality of input nodes, a "hidden layer" having a plurality of hidden layer nodes, and an output layer having a plurality of output nodes. Each input node represents a respective programme. Each input node is connected to each hidden layer node, and each connection between an input node and a hidden layer node has an associated weight. Each of the hidden layer nodes are connected to each of the output nodes, the output nodes also representing respective programmes. Each connection between a hidden layer node and an output node also has an associated weight. Each hidden layer node and each output layer node is a respective neuron, an example of which is illustrated in FIG. 6.

Figure 6:
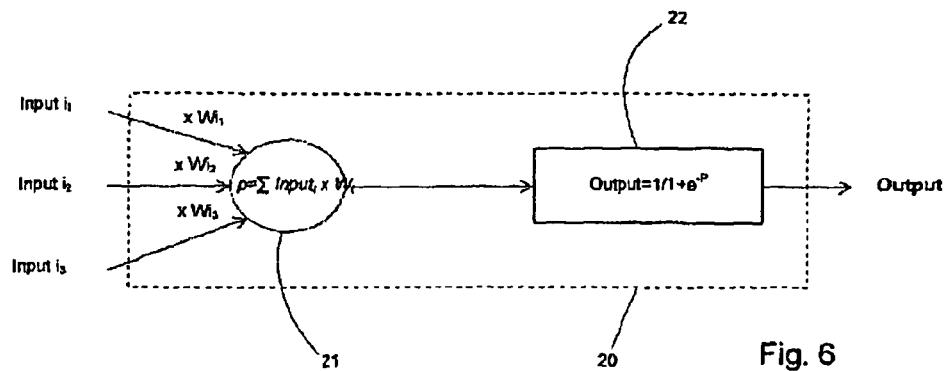
FIG. 6 is a schematic illustration of an artificial neuron used in a neural network of the present invention.

Referring to FIG. 6, three inputs $i_1$, $i_2$, $i_3$ are connected to a neuron 20 by respective input connections. Each input connection has a respective input weight $Wi_2$, $Wi_2$, $Wi_3$. The activated inputs (multiplied by the respective weights) are summed at a node 21 to produce an output p as shown at equation (1):

$$p = \sum_{n}^{n} i_n \times Wi_n \quad (1)$$

The output p from the node 21 is provided to a node 22. The output of the node 22 in response to its input, p, is determined by its activation function (2), which in the described embodiment is a sigmoid function (in particular, the logistic function):

$$\text{Output} = 1/1 + e^{-p} \quad (2)$$

A plurality of the neurons 20 shown in FIG. 6 together make up a neural network, an example of which is described in more detail below, with reference to FIG. 10. It will be appreciated that the output from the hidden layer nodes provides the inputs for the output layer nodes. A relatively small network can provide solutions to very complex problems and the power of the network increases almost exponentially with the number of neurons in the hidden layer.

The training of the neural network at step S5 is by way of backpropagation. In general terms, training comprises updating the weights ($Wi_n$) of the neural network until the outputs of a training set are activated in response to the inputs of that training set (activation of an output node being indicated, for example, by an output greater than 0.5).

In more detail, the network is initialised with a set of random weights. An Input pattern is then applied, causing activation of some of the output nodes (this step is known as the forward pass). As the weights have been randomised, the activated output nodes are unlikely to correspond with the target output nodes. The difference between the generated outputs and the target outputs defines the error value for output nodes. The weights of the connections between the hidden layer and the output layer are then modified using the error value (this step is known as the backward pass). For example, the weights may be modified using a gradient descent algorithm. Next, the error value of each hidden layer node is calculated by back propagating the error values of the output layer nodes connected to those hidden layer nodes through the weights of the respective connections between the hidden layer node and the output layer nodes connected to that hidden layer node. That is, generally, for a particular hidden-layer node, the errors of the output layer nodes connected to that hidden layer node are multiplied by the weights of the respective output layer connections to that hidden layer node. The weights of the hidden layer nodes are then updated, the weights for all layers being gradually updated until the desired network output is achieved. This process is then repeated for the plurality of input-target training sets generated at step S4.

Backpropagation and its application will be well known to those skilled in the art and is therefore not described in any further detail herein.

Once the neural network has been trained to produce the correct output in response to input patterns for a plurality of users, the neural network will also respond to inputs that are similar, but not identical, to the training set of Inputs. The ability to respond to similar inputs is referred to as generalisation. Multi-layer networks are able to offer higher levels of generalisation than single layer networks, each layer adding further generalisation to the preceding layer. The three layer network of the described embodiment (containing an input layer, a hidden layer and an output layer) can generalise non-linearly separable input patterns, such as the programme viewing interests of a user.

For recall mode operation, only a relatively simple processor is needed. Further, as is described in more detail below with reference to FIG. 10, the complete neural network generated by the server 7 need not be sent to each user at step S6. Rather, only those neurons which could be activated by a particular user's viewing history need be transmitted to that particular user. Additionally, while in the training mode the neural network utilizes a sigmoid function for the activation function (in order to simplify the process of error minimisation), the activation function of the neural network may be simplified in recall mode, the sigmoid function (2) being replaced by a simple threshold as shown in equation (3):

$$\text{Output} = \begin{cases} 1 & \text{if } p > \text{threshold} \\ 0 & \text{otherwise} \end{cases} \quad (3)$$

As described above, the trained neural network can generalise the learned relationships between the inputs and outputs of the training set, in order to respond to input patterns which are similar, but not identical, to those of the training sets. At each user's viewing device, the neural network is provided with the viewing history of that user as input (for example, at the viewing device 1a, the neural network is supplied with the viewing history of user A as inputs). The output nodes activated in response to a particular user's viewing history can be considered to be a set of recommended programmes for that user based upon the viewing histories of those users who contributed to the training set that have similar viewing interests. As they are based upon the viewing histories of a plurality of other users, the recommendations may include programmes which have not previously been viewed by the user using the neural network.

For example, where the neural network is trained with the viewing histories and indicated interests of users A, C and used to generate programme recommendations for user B, the recommendations may include programmes watched or listened to by users A or C, but which have not previously been watched or listened to by user B. Additionally, where the training set comprises inputs and outputs relating to the candidate users' interests in future, un-viewed or un-aired programming (as described above), recommendations can be made for programmes which have not been viewed by any of the users of the system.

Figure 7:
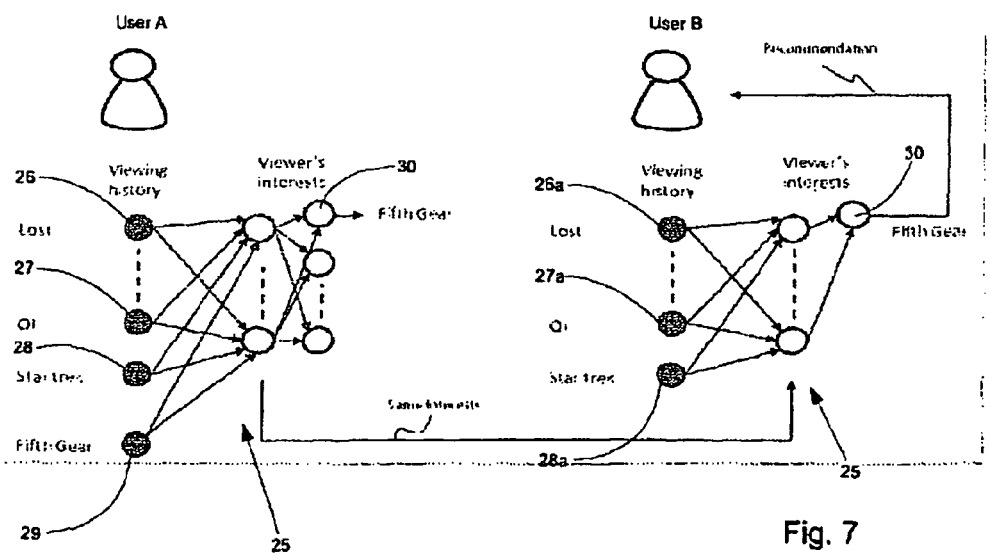
FIG. 7 is a schematic illustration showing how a neural network is used to generate audiovisual content item recommendations in some embodiments of the present invention.

FIG. 7 illustrates an example of a neural network generated as described above with reference to FIG. 5. In the example of FIG. 7, a neural network 25 is generated based upon the viewing history and indicated interests of the user A. In particular, the neural network 25 is trained based upon an input 26 corresponding to a programme "Lost", an input node 27 corresponding to a programme "Qi", an input node 28 corresponding to a programme "Star trek" and an Input node 29 corresponding to a programme "Fifth Gear", each input indicating that the user A has watched or listened to, or expressed an interest in, the corresponding programme. In response to the Inputs 26 to 29, the neural network 25 activates an output node 30 representing the programme "Fifth Gear". That is, the neural network 25 has been trained to recognise that users who watch the programmes represented by the input nodes 26 to 29 would be interested in watching the programme "Fifth Gear". It will be appreciated that only part of the neural network 25 is shown in FIG. 7. For example, given that the neural network is trained solely based upon the viewing history and additional data of user A, there would be an output node corresponding to the programmes of each of the inputs 26 to 29. It will further be appreciated that, in general, a neural network will not be generated based upon a single user's viewing history and additional data.

Part of the neural network 25 is transmitted to the user B (i.e. at step S6 of FIG. 5). The user B executes the neural network 25 using the user B's viewing history as inputs. In particular, the user B's inputs include an input 26a representing the programme "Lost" an input 27a representing the programme "Qi" and an input 28a representing the programme "Star trek". That is, the user B watched three of the same programmes as the user A, but did not watch "Fifth Gear". In response to the inputs 26a to 28a, the output node 30 is activated, indicating that the user B may be interested in watching "Fifth Gear".

The programmes corresponding to the activated output nodes may be cross-referenced against a list of programmes which are available for viewing by that user. Programmes which are both "recommended" by the neural network, and available to watch by that user are presented to the user as programme recommendations, for example in an EPG displayed on the user's viewing device. Recommendations may also be made for programmes which are not available to view by a particular user (for example if they do not subscribe to particular channels on which a programme is aired) in order to advertise services for which that user does not currently subscribe.

Figure 8:
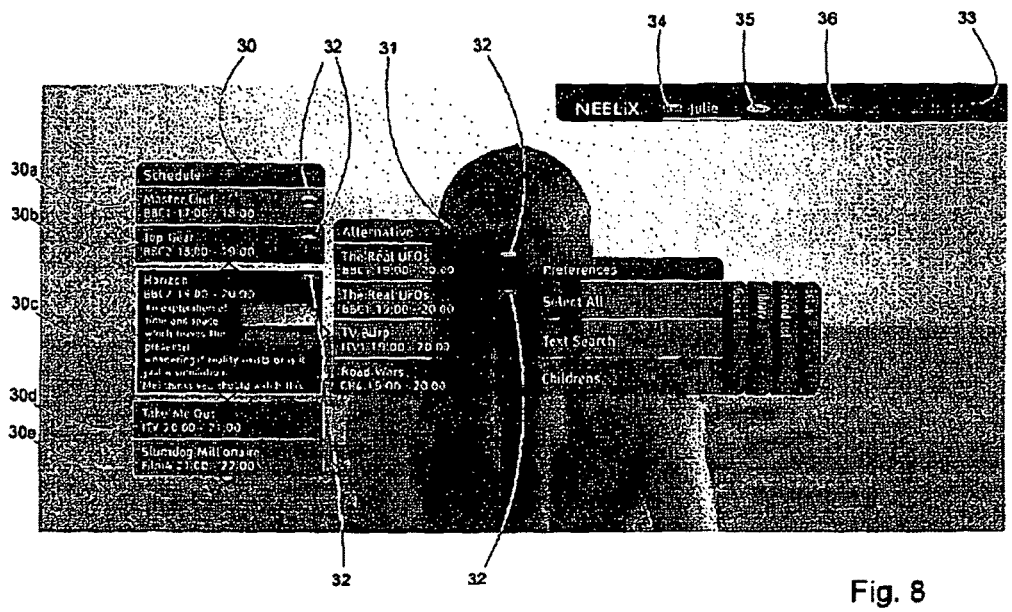
FIG. 8 is a screenshot of an programme recommendation user interface in accordance with some embodiments of the present invention.

FIG. 8 is a screenshot of an example schedule of recommendations which can be displayed to a user in accordance with the present invention. Recommendations are prioritised and organized into a schedule column 30. To prioritize the recommendations, the neural network may be executed a plurality of times with a user's viewing history as input, while iterating through decreasing output threshold values for the activation function. In this way, the recommendations generated with a relatively low threshold can be assigned a lower priority than those generated with a higher threshold.

It can be seen that the schedule column 30 has schedule positions 30a to 30e, each corresponding to a particular timeslot in a contiguous schedule. Schedule position 30a relates to a timeslot 17:00 to 18:00, schedule position 30b relates to a timeslot 18:00 to 19:00, schedule position 30c relates to a timeslot 19:00 to 20:00, schedule position 30d relates to a timeslot 20:00 to 21:00 and schedule position 30e relates to a timeslot 21:00 to 22:00. Each schedule position displays a respective programme recommendation for that timeslot. A user can highlight a particular schedule position (for example using a direction keypad on a remote control) to obtain more detail about the programme recommended in that schedule position. For example, as shown in FIG. 8, the schedule position 30c is currently highlighted, displaying information about a programme "Horizon" broadcast between 19:00 and 20:00. A column 31 provides a plurality of alternative recommendations that are available for a highlighted schedule position (as illustrated in more detail in FIG. 9).

Programmes provided as alternative recommendations in column 31 can similarly be highlighted (for example by pressing a right arrow on a directional keypad having first selected a particular schedule position 30a to 30c in column 30) to display further information about that programme recommendation.

A single viewing device 1a, 1b, 1c may have a plurality of users, each with differing tastes and interests. In some embodiments of the present invention a user can indicate their presence. For example, referring to FIGS. 8 and 9, a user can indicate their presence by, selecting a coloured button on a remote control (not shown), the colour corresponding to one of a plurality of coloured icons in a user bar 33. The user bar 33 comprises a red icon 34 corresponding to a user "Julie", a yellow icon 35 corresponding to a user "Ken" and a green icon 38 corresponding to a user "Jen". When a user has indicated their presence via the EPG the viewing history and additional information (for example about future programming) is recorded for that particular user. Alternatively or additionally, groups of users may be defined (for example, blue for children, red for parents).

In this way, programme recommendations can be generated for, and targeted at particular users or groups of users.

Figure 9:
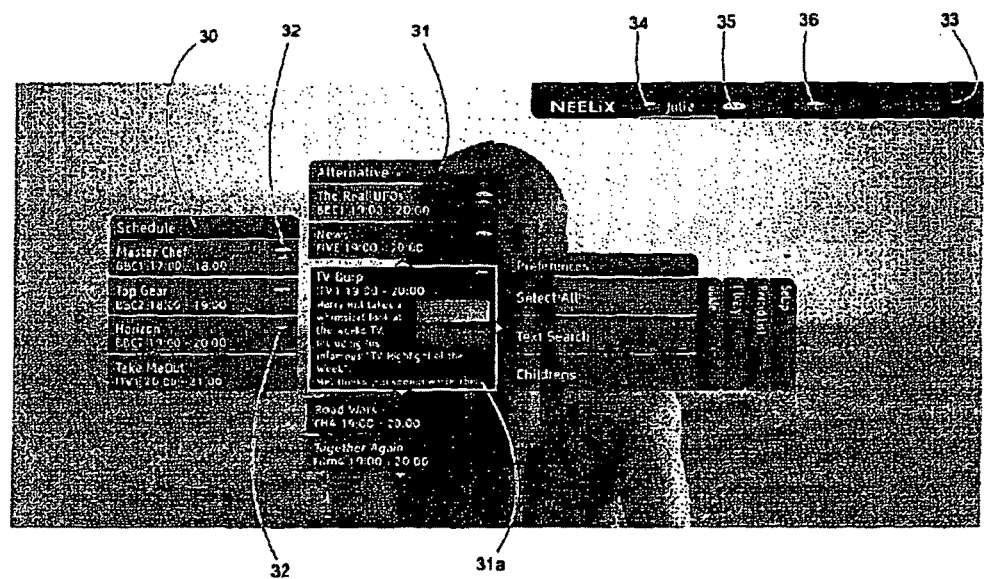
FIG. 9 is a screenshot of a programme recommendation user interface illustrating alternative recommendations, in accordance with some embodiments of the present invention.

For example, as shown in FIGS. 8 and 9, the user(s) to which a programme recommendation is directed is indicated by an icon 32 displayed in each schedule position 30a to 30e. The colour of each icon 32 corresponds to the coloured icons 34 to 35 in the user bar 33.

Where a viewing device has multiple users, the prioritization of programme recommendations may be based upon a user currently watching the viewing device. In FIGS. 8 and 9, for example, a user "Julie" is present, as indicated by a line beneath the red icon 34 in the user bar 33. As such, the recommendation in the current schedule position 30c of FIG. 9 has a corresponding red icon 32. Where a programme recommendation for a particular timeslot does not exist for a currently present user, programme recommendations for other users may be displayed.

The EPG may also provide recommendations made specifically for a particular user of the system by other users of the system (In addition to those generated by a neural network). For example, in FIG. 9, a highlighted alternative recommendation 31a contains a message "Mel thinks you should watch this".

Figure 10:
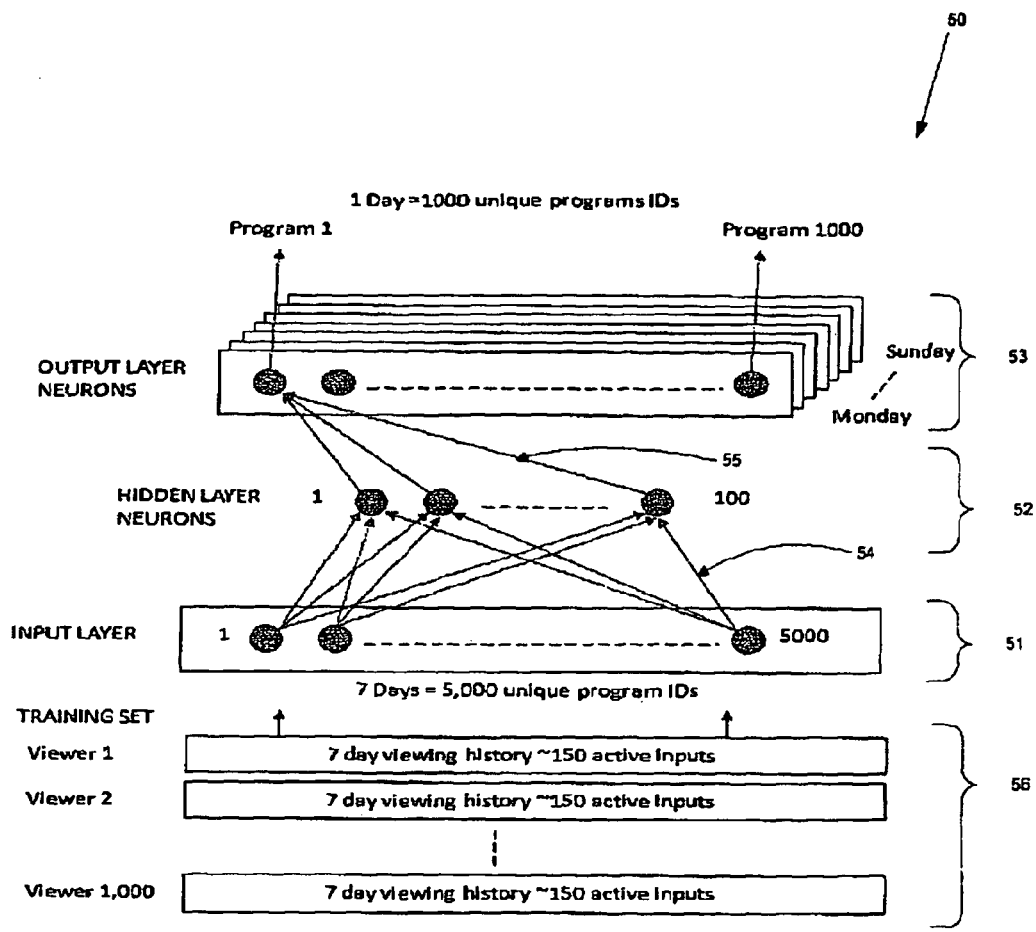
FIG. 10 is a schematic illustration showing a neural network which may be used in accordance with some embodiments of the present invention.

FIG. 10 schematically illustrates an example of a neural network that may be used in some embodiments of the present invention. A neural network 50 comprises an input layer 51 having five thousand input nodes each representing a unique programme that has been watched or listened to by at least one user in a preceding seven-day period. The neural network 50 further comprises a hidden layer 52 having one-hundred hidden layer nodes. The neural network further comprises an output layer 53 having one-thousand output nodes for each day of the week (seven-thousand output nodes in total). For each day of the week, each output node corresponds to a unique programme that can be viewed or listened to on that day. Each input node is connected to each hidden layer node, such that the hidden layer 52 has five-hundred-thousand input connections 54, each with a respective input weight. Each of the hidden layer nodes is connected to each of the output layer nodes, such that the output layers 53 has seven-hundred-thousand output connections 55, each with a respective output weight. The network 50 therefore comprises seven-thousand one-hundred neurons with a total of one-million two-hundred-thousand weights.

The neural network 50 is created from a training set 56 comprising seven-day viewing histories of one-thousand users, each viewing history comprising approximately one-hundred-fifty programmes. It will be appreciated that many of the one-thousand users will watch or listen to the same programmes (resulting in, for example, five-thousand unique programmes for the input nodes, rather than one-hundred-fifty-thousand).

As described above, in recall mode, it is only necessary to process those neurons which have inputs that can be activated by the viewing history of the User for which the neural network is being run. For example, the viewing history of a user over a seven day period may contain approximately one-hundred-fifty unique programme entries out of a possible five-thousand unique programmes available to view by that user. In recall mode, the inputs to the hidden-layer can therefore be reduced from five-thousand per neuron to one-hundred-fifty per neuron, thereby reducing the size of the neural network which need be downloaded to each user's viewing device 1a, 1b, 1c and reducing the number of computations necessary to utilize the neural network 50 for a particular user. The size of the neural network 50 can further be reduced by transmitting only a limited subset of the connections between the hidden layer 52 and the output layer 53. For example, in some embodiments, for each output node, only the ten most significant output connections are transmitted to the users A, B, C.

In this example, calculations need only be performed for fifteen-thousand input weights and ten-thousand output weights (for a particular day of the week). The number of calculations which need be performed to run the neural for a particular input is approximately equal to the number of weights. Assuming that a simple processor available in a viewing device can perform fifty-thousand multiplication operations in 3 ms, the neural network 50 can be executed for a particular user in approximately 3 ms.

It is described above that recommendations may be prioritized based upon the user(s) currently present and based upon varying activation functions. Prioritization of recommendations may also occur based upon particular timeslots for which the recommendations are generated. That is, while content of interest to a particular user (or group of users) may be available for viewing in any timeslot, that user or group of users may only watch or listen to content during particular timeslots, or may watch or listen to different types of content dependent upon the timeslot. For example, while cartoons may be available for viewing at any time of the day, it may be appropriate to recommend cartoons only for timeslots occurring before 18:00.

Figure 11:
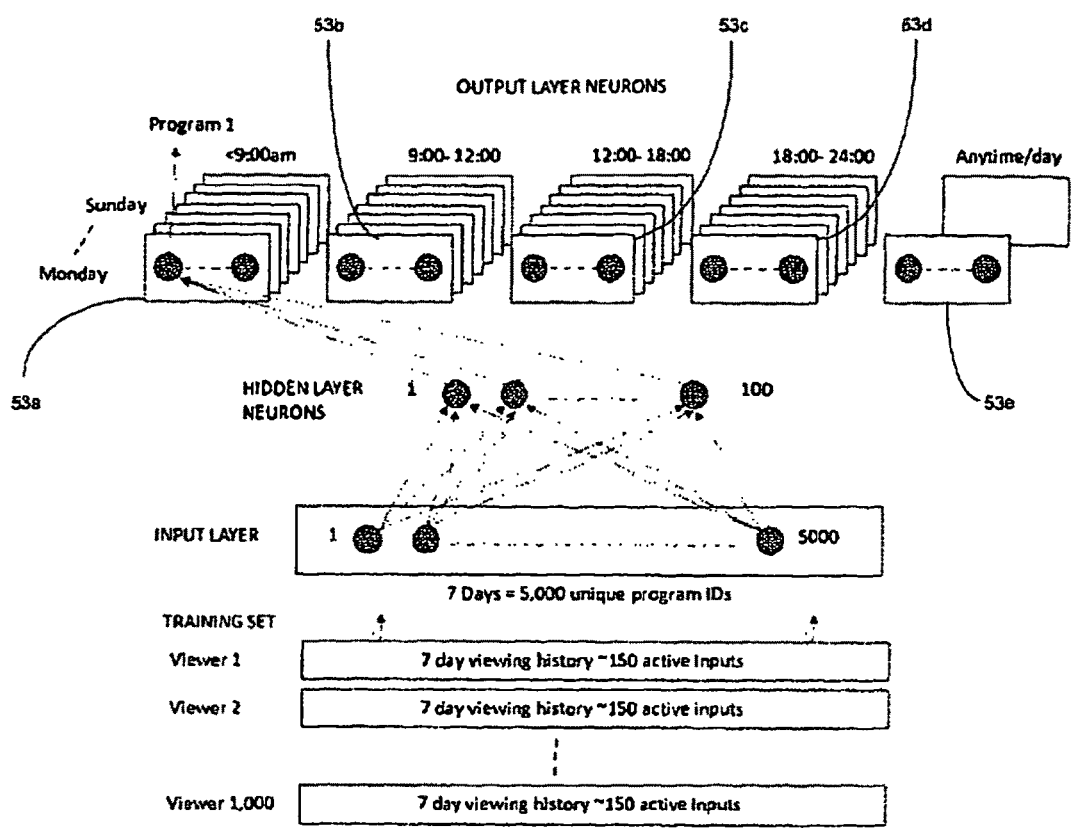
FIG. 11 is a schematic illustration showing a neural network which may be utilized to prioritize recommendations on a time of day basis.

In order to prioritize recommendations based upon timeslot, the neural network may be adapted take account of when particular programmes are viewed. That is, where a programme is most often watched in a first timeslot and rarely watched in a second timeslot, the programme can be assigned a high priority for the first timeslot, and a low priority for the second timeslot. Referring to FIG. 11, the example neural network 50 is shown with the output layer 53 classified into five timeslots. A timeslot 53a contains output nodes which represent programmes to be recommended before 9:00; a timeslot 53b contains output nodes representing programmes to be recommended between 9:00 and 12:00, a timeslot 53c contains output nodes representing programmes to be recommended between 12:00 and 18:00; and a timeslot 53d contains output nodes representing programmes to be recommended between 18:00 and 24:00. A final timeslot 53e contains output nodes representing programmes which can be recommended for any timeslot. In this way, when processing the neural network to generate recommendations for a particular timeslot, the recommendation engine may only recommend programmes for appropriate timeslots, or may simply prioritize programmes based upon timeslot.

It has been described above that neural networks are trained at a server 7 and transmitted to the viewing devices 1a, 1b, 1c of each user A, B, C for processing. It will be appreciated that either the server may both train the neural networks and generate programme recommendations based upon received viewing histories for each user. In this case, only the programme recommendations would be transmitted to respective users. Alternatively, provided that the viewing device (or connected computing device) comprises a sufficiently powerful processor, the user's viewing device may both train the neural network and calculate recommendations based upon that user's viewing history.

Various modifications and applications of the present invention will be readily apparent to the appropriately skilled person from the teaching herein, without departing form the scope of the appended claims.

The invention claimed is:

1. A method for facilitating the generation of recommendations of audiovisual content for a first user, the method comprising:

receiving data from a plurality of second users, the received data indicating audiovisual content of interest to the second users and timeslots associated with respective audiovisual content items in said audiovisual content of interest to the second users;

for each respective second user in said plurality of second users:

determining whether the audiovisual content of interest to said second user meets at least one predetermined criterion, wherein said at least one predetermined criterion comprises a minimum number of audiovisual content items not viewed or listened to by a predetermined number of others of said second users;

if said audiovisual content does not meet said at least one predetermined criterion, receiving further data from an additional second user, said further data indicating audiovisual content of interest to said additional second user; and processing said received data and said further received data to automatically identify a plurality of relationships between interests of one or more of said second users in respective items of audiovisual content and viewing timeslots of said audiovisual content represented by said received data and generate a recommendation engine, the recommendation engine being adapted to:

take as input indications of audiovisual content of interest to said first user and to generate recommendations of further audiovisual content of interest to the first user based upon a subset of said plurality of relationships, and assign a respective priority to each generated recommendation based upon the timeslots, at least some of the recommendations relating to an audiovisual content item of the respective audiovisual content items but having a different priority for each of a plurality of timeslots.

2. The method of claim 1, wherein said received data comprises data indicating audiovisual content viewed or listened to by at least one of said second users; and wherein said recommendation engine is adapted to generate recommendations for the audiovisual content indicated in said received data.

3. The method of claim 1, wherein said received data comprises data indicating second audiovisual content which has not been viewed or listened to by at least one of said second users; and wherein said recommendation engine is adapted to generate recommendations for said second audiovisual content.

4. The method of claim 3, wherein said data indicating second audiovisual content indicates that said at least one second user has indicated an interest in said second audiovisual content.

5. The method of claim 3, wherein said interest is indicated by selection of a representation of said second audiovisual content by at least one second user.

6. The method of claim 1, further comprising transmitting a part of said recommendation engine to said first user the part being based upon the audiovisual content of interest to said first user.

7. The method of claim 1, wherein said recommendation engine is a neural network comprising a plurality of input nodes, each input node representing a respective audiovisual content item, at least one hidden layer node and a plurality of output nodes, each output node representing a respective audiovisual content item.

8. The method of claim 7, further comprising transmitting a part of said recommendation engine to said first user the part being based upon the audiovisual content of interest to said first user; and wherein said part comprises only those input nodes corresponding to the audiovisual content items of interest to said first user, only those hidden layer nodes which can be activated by said input nodes of said part and only those output nodes which can be activated by said hidden layer nodes of said part.

9. The method of claim 1, wherein said data received from the plurality of second users comprises data indicating audiovisual content of interest to at least one of said second users during a preceding predetermined period.

10. The method of claim 1, wherein said at least one predetermined criterion comprises a minimum number of respective audiovisual content items indicated as being of interest to said respective second user.

11. The method of claim 1, wherein processing said received data to generate said recommendation engine comprises training a neural network to identify relationships between audiovisual content items indicated in said data received from said plurality of second users; and said recommendation engine is said trained neural network.

12. The method of claim 1, wherein said recommendation engine is adapted to generate at least one first recommendation having a first priority using a first subset of said relationships and to generate at least one second recommendation having a second priority using a second subset of said relationships.

13. The method of claim 12, wherein said recommendation engine is adapted to display said first at least one recommendation on a display as a primary recommendation and to display said second at least one recommendation on said display as a secondary recommendation.

14. Apparatus for facilitating the generation of recommendations of audiovisual content for a first user, comprising:

means for receiving data from a plurality of second users, the received data indicating audiovisual content of interest to the second users and timeslots associated with respective audiovisual content items in said audiovisual content of interest to the second users;

means for determining, for each respective second user in said plurality of second users, whether the audiovisual content of interest to said second user meets at least one predetermined criterion, wherein said at least one predetermined criterion comprises a minimum number of audiovisual content items not viewed or listened to by a predetermined number of others of said second users;

means for receiving, if said audiovisual content does not meet said at least one predetermined criterion, further data from an additional second user, said further data indicating audiovisual content of interest to said additional second user; and means for processing said received data and said further received data to automatically identify relationships between interests of one or more of said second users in respective items of audiovisual content and viewing timeslots of said audiovisual content represented by said received data and generate a recommendation engine, the recommendation engine being adapted to:

take as input indications of audiovisual content of interest to said first user and being adapted to generate recommendations of further audiovisual content of interest to the first user based upon a subset of said plurality of relationships, and assign a respective priority to each generated recommendation based upon said timeslots, at least some of the recommendations relating to an audiovisual content item of the respective audiovisual content items but having a different priority for each of a plurality of timeslots.

15. Apparatus for generating at least one recommendation for audiovisual content for a first user, comprising:

a first computer comprising:

means for receiving first data indicating audiovisual content of interest to a plurality of second users;

means for determining, for each respective second user in said plurality of second users, whether the audiovisual content of interest to said second user meets at least one predetermined criterion, wherein said at least one predetermined criterion comprises a minimum number of audiovisual content items not viewed or listened to by a predetermined number of others of said second users;

means for receiving, if said audiovisual content does not meet said at least one predetermined criterion, second data from an additional second user, said second data indicating audiovisual content of interest to said additional second user;

means for processing said first data and said second data to automatically identify relationships between interests of one or more of said second users in audiovisual content items and viewing timeslots said audiovisual content indicated by said first data and generate a recommendation engine, the recommendation engine being adapted to:

take as input indications of audiovisual content of interest to the first user and being adapted to generate recommendations of further audiovisual content of interest to the first user based on a subset of said relationships, and assign a respective priority to each generated recommendation based upon said timeslots, at least some of the recommendations relating to an audiovisual content item of the respective audiovisual content items but having a different priority for each of a plurality of timeslots; means for transmitting at least part of said recommendation engine to a second computer;

the second computer comprising:

means for receiving said at least part of said recommendation engine; and means for generating at least one recommendation by providing data indicating audiovisual content of interest to said first user as input to said at least part of said recommendation engine.

* * * * *